3,332,977
5 - (γ - HYDROCARBONYL - SULFONYLOXYPRO-
PYL- AND γ-HYDROCARBAMYL-SULFONYL-
OXYPROPYLIDENE) - 5H - DIBENZO[a,d] - CY-
CLOHEPTENE COMPOUNDS
Norman L. Wendler, Summit, N.J., assignor to Merck
& Co., Inc., Rahway, N.J., a corporation of New
Jersey
No Drawing. Original application June 7, 1962, Ser. No.
200,659. Divided and this application July 7, 1965, Ser.
No. 470,228
16 Claims. (Cl. 260—456)

This invention relates to novel intermediates for the synthesis of derivatives of dibenzocycloheptenes. More particularly, this invention relates to intermediates useful in the synthesis of 5H-dibenzo[a, d]cycloheptenes and 5H-dibenzo[a, d]-10,11-dihydrocycloheptenes which are substituted at the 5-carbon atom with an amino propyl or amino propylidene radical.

This application is a division of my copending application Ser. No. 200,659, filed June 7, 1962, and now abandoned.

The end compounds of the invention are useful in the treatment of mental health conditions, as they are antidepressants and serve as mood elevators or psychic energizers. The compounds are preferably administered in the form of their acid addition salts and these salts are included in the scope of this invention.

The end compounds formed by the method of the invention may be represented by the general formulae:

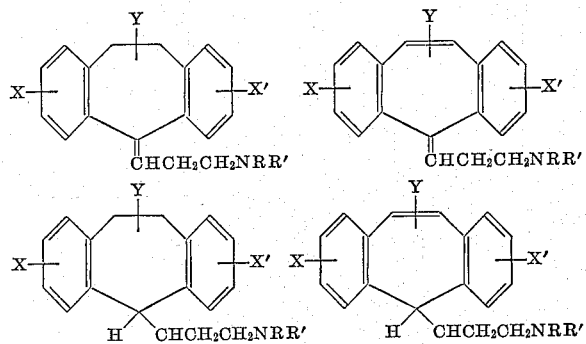

wherein R and R' may be hydrogen, alkyl, aryl, aralkyl, alkaryl, alkoxy, lower alkenyl, cycloloweralkyl and lower alkyl radicals linked together with an atom selected from the group consisting of nitrogen, carbon and oxygen to form a heterocyclic ring, such as 1-piperidyl, 1-pyrrolidyl, 4-morpholinyl and 1-lower alkyl-4-piperazinyl; Y is hydrogen or halogen and X and X' may be similar or dissimilar and are selected from the group consisting of hydrogen, lower alkyl, lower alkoxy, lower alkenyl, haloloweralkyl, phenyl or substituted phenyl, an acyl group having up to 4 carbon atoms, haloacyl having up to 4 carbon atoms, a loweralkylsulfonylamino, halogen, hydroxyl, haloloweralkoxy, cyano, carboxy, carbamyl, loweralkylcarbamyl, diloweralkylcarbamyl, loweralkoxycarbonyl, mercapto, loweralkylmercapto, haloloweralkylmercapto, loweralkylsulfonyl, haloloweralkylsulfonyl, sulfamyl, loweralkylsulfamyl, diloweralkylsulfamyl; more than one of these substituents may be on each benzenoid ring.

The method of the present invention will be illustrated schematically by the following flow sheet, in which the dotted lines indicate that the compound may be saturated or unsaturated at the respective positions.

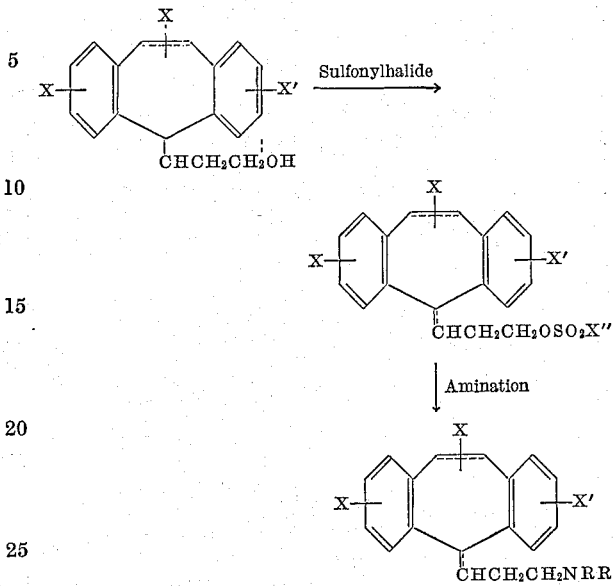

wherein X, X', Y, R and R' are as defined above and X'', which is part of a group which is removed during the amination step, suitably is a hydrocarbon radical such as alkyl, aryl, aralkyl, alkaryl and the like.

The method of the present invention begins with the known hydroxypropyl or hydroxypropylidene derivative of a 5H-dibenzo[a, d]cycloheptene or 5H-dibenzo[a, d] 10,11-dihydrocycloheptene which may be substituted with X, X' and Y substituents. These known starting materials are in turn prepared from the known 5H-dibenzo[a, d] cyclohepten-5-ones and 5H-dibenzo[a, d]-10,11-dihydrocyclohepten-5-ones, described in numerous places in the literature; for example, by A. C. Cope et al. in the J.A.C.S., 73, pp. 1673–1678 (1951) and elsewhere. The starting compounds for the ketones, and particularly those having substituents on the benzene rings, may be made by following the teachings of T. W. Campbell et al. in an article entitled "Synthesis of 2'-acetamido-2,3,6,7-dibenzotropilidene and 2 - acetamido-9,9-dimethylfluorene," appearing in Helv. Chem. Acta, 36, pp. 1489–1499 (1953). The conversion of the ketone to the 5-hydroxy derivative and thence to the 5-halo intermediate has also been described in the J. Med. Pharm. Chem., 5, p. 373 (1962) and in the J. Med. Pharm. Chem., 4, p. 411 (1961).

In the present invention, there is provided a conversion of the 5-(γ-hydroxypropyl) or 5-(γ-hydroxypropylidene) starting compound to the corresponding 5-(γ-aminopropyl) or 5-(γ-aminopropylidene) compound by a two-step process. The first step of the process involves the conversion of the hydroxy compound to a sulfonyl derivative thereof. In a typical run, 5-(γ-hydroxypropylidene)-5H-dibenzo[a, d]-10,11-dihydrocycloheptene is reacted with methane sulfonyl chloride to form the intermediate 5-(γ-methanesulfonyloxypropylidene) - 5H - dibenzo[a, d]-10, 11-dihydrocycloheptene.

Suitable sulfonating agents include hydrocarbon substituted sulfonyl halides such as alkyl, aryl and alkaryl sulfonyl halides as, for example, p-toluenesulfonyl chloride, methane sulfonyl chloride, benzene sulfonyl chloride, p-nitrobenzenesulfonyl chloride, ethyl sulfonyl chloride and the like.

As representative 5-(γ-hydrocarbonsulfonyloxypropyl)- 5H-dibenzo[a, d]cycloheptenes, 5-(γ-hydrocarbonsulfonyloxypropylidene)-5H-dibenzo[a, d]cycloheptenes and 10,11-dihydro derivatives thereof included within the scope of this invention, there may be mentioned:

(1) The 5-(γ-loweralkylsulfonyloxypropyl)-5H-dibenzo-[a, d]cycloheptenes and
5-(γ-loweralkylsulfonyloxypropyl)-5H-dibenzo[a, d] 10,11-dihydrocycloheptenes such as
5-(γ-mesyloxypropyl)-5H-dibenzo[a, d]cycloheptene,
5-(γ-mesyloxypropyl)-5H-dibenzo[a, d]-10,11-dihydrocycloheptene,
5-(γ-ethylsulfonyloxypropyl)-5H-dibenzo[a, d] cycloheptene,
5-(γ-propylsulfonyloxypropyl)-5H-dibenzo[a, d] cycloheptene and
5-(γ-butylsulfonyloxypropyl)-5H-dibenzo[a, d] 10,11-dihydrocycloheptene.

(2) The 5-(γ-loweralkylsulfonyloxypropylidene)-5H-dibenzo[a, d]cycloheptenes and
5-(γ-loweralkylsulfonyloxypropylidene)-5H-dibenzo[a, d]-10,11-dihydrocycloheptenes such as
5-(γ-mesyloxypropylidene)-5H-dibenzo[a, d] cycloheptene,
5-(γ-mesyloxypropylidene)-5H-dibenzo[a, d]-10,11-dihydrocycloheptene,
5-(γ-ethylsulfonyloxypropylidene)-5H-dibenzo[a, d] cycloheptene,
5-(γ-propylsulfonyloxypropylidene)-5H-dibenzo[a, d] cycloheptene and
5-(γ-butylsulfonyloxypropylidene)-5H-dibenzo[a, d]-10, 11-dihydrocycloheptene.

(3) The 5-(γ-arylsulfonyloxypropyl)-5H-dibenzo[a, d] cycloheptenes and
5-(γ-arylsulfonyloxypropyl)-5H-dibenzo[a, d]-10,11-dihydrocycloheptenes such as
5-(γ-benzenesulfonyloxypropyl)-5H-dibenzo[a, d] cycloheptene,
5-(γ-benzenesulfonyloxypropyl)-5H-dibenzo[a, d]-10,11-dihydrocycloheptene,
5-(γ-naphthylsulfonyloxypropyl)-5H-dibenzo[a, d] cycloheptene,
5-(γ-naphthylsulfonyloxypropyl)-5H-dibenzo[a, d]-10, 11-dihydrocycloheptene,
5-(γ-p-nitrobenzenesulfonyloxypropyl)-5H-dibenzo[a, d] cycloheptene,
5-(γ-p-nitrobenzenesulfonyloxypropyl)-5H-dibenzo[a, d]-10,11-dihydrocycloheptene,
5-(γ-p-chlorobenzenesulfonyloxypropyl)-5H-dibenzo[a, d]cycloheptene and
5-(γ-p-chlorobenzenesulfonyloxypropyl)-5H-dibenzo[a, d]-10,11-dihydrocycloheptene.

(4) The 5-(γ-arylsulfonyloxypropylidene)-5H-dibenzo[a, d]cycloheptenes and
5-(γ-arylsulfonyloxypropylidene)-5H-dibenzo[a, d]-10, 11-dihydrocycloheptenes such as
5-(γ-benzenesulfonyloxypropylidene)-5H-dibenzo[a, d] cycloheptene,
5-(γ-benzenesulfonyloxypropylidene)-5H-dibenzo[a, d]-10,11-dihydrocycloheptene,
5-(γ-naphthylsulfonyloxypropylidene)-5H-dibenzo[a, d] cycloheptene,
5-(γ-naphthylsulfonyloxypropylidene)-5H-dibenzo[a, d]-10,11-dihydrocycloheptene,
5-(γ-p-nitrobenzenesulfonyloxypropylidene)-5H-dibenzo[a, d]cycloheptene,
5-(γ-p-nitrobenzenesulfonyloxypropylidene)-5H-dibenzo[a, d]-10,11-dihydrocycloheptene,
5-(γ-p-chlorobenzenesulfonyloxypropylidene)-5H-dibenzo[a, d]cycloheptene and
5-(γ-p-chlorobenzenesulfonyloxypropylidene)-5H-dibenzo[a, d]-10,11-dihydrocycloheptene.

(5) The 5-(γ-alkarylsulfonyloxypropyl)-5H-dibenzo[a, d] cycloheptenes,
5-(γ-alkarylsulfonyloxypropyl)-5H-dibenzo[a, d]-10,11-dihydrocycloheptenes,
5-(γ-alkarylsulfonyloxypropylidene)-5H-dibenzo[a, d] cycloheptenes and
5-(γ-alkarylsulfonyloxypropylidene)-5H-dibenzo[a, d]-10,11-dihydrocycloheptenes such as
5-(γ-p-tolylsulfonyloxypropyl)-5H-dibenzo[a, d] cycloheptene,
5-(γ-p-tolylsulfonyloxypropyl)-5H-dibenzo[a, d]-10,11-dihydrocycloheptene,
5-(γ-p-tolylsulfonyloxypropylidene)-5H-dibenzo[a, d] cycloheptene and
5-(γ-p-tolylsulfonyloxypropylidene)-5H-dibenzo[a, d]-10,11-dihydrocycloheptene.

As representative of the nuclear substituted derivatives of the above-enumerated compounds, there may be mentioned:

3-chloro-5-(γ-mesyloxypropyl)-5H-dibenzo[a, d] cycloheptene;
5-(γ-mesyloxypropylidene)-3-methylsulfonyl-5H-dibenzo[a, d]cycloheptene;
5-(γ-p-tolylsulfonyloxypropylidene)-3-trifluoromethyl-5H-dibenzo[a, d]cycloheptene;
3-methyl-5-(γ-p-tolylsulfonyloxypropylidene)-5H-dibenzo[a, d]-10,11-dihydrocycloheptene;
5-(γ-mesyloxypropylidene)-3-methoxy-5H-dibenzo[a, d] cycloheptene;
3-dimethylsulfamyl-5-(γ-p-tolylsulfonyloxypropylidene)-5H-dibenzo[a, d]cycloheptene; and
10-chloro-5-(γ-mesyloxypropylidene)-5H-dibenzo[a, d] cycloheptene.

The final step in the process is the amination of the sulfonyl derivative to form the desired secondary or tertiary amine. In a typical run, 5-(γ-methanesulfonyloxypropyl)-5H-dibenzo[a, d]cycloheptene is reacted with monomethylamine to form the desired compound 5-(γ-methylaminopropyl)-5H-dibenzo[a, d]cycloheptene. Suitably, the hydrolysis may be carried out by combining the sulfonyl compound with a solvent and then reacting it with the desired amine. Typical amines which may be used include ammonia, alkylamines such as methylamine and dimethylamine, cycloloweralkylamines, loweralkenylamines, arylamines, aralkylamines and amines containing loweralkyl groups linked together through an atom selected from the group consisting of nitrogen, and oxygen to form a heterocyclic ring such as 1-piperidyl, 1-pyrrolidyl, 4-morpholinyl and 1-lower alkyl-4-piperazinyl. Amines substituted with halogen and other substituents may also be used.

The following examples will further illustrate the invention.

EXAMPLE 1

*5-(γ-hydroxypropylidene)-5H-dibenzo[a,d]-10,11-dihydrocycloheptene*

5 - cyclopropyl-5-hydroxy-5H-dibenzo[a,d]-10,11-dihydrocycloheptene.—To a 125 ml., 3-necked flask (flamed out and cooled under dry nitrogen) equipped with a stirrer, addition funnel and ether-type condenser are charged 1.7 g. (0.070 mole) of clean magnesium turnings and 15 ml. of dry tetrahydrofuran (THF). 8.5 g. (0.0702 mole) of cyclopropylbromide in 15 ml. of dry THF is added dropwise, with stirring, at a rate sufficient to maintain a gentle reflux. Gentle warming and stirring for about 30 minutes is needed to start the reaction, after which no external heat is required. Stirring and refluxing is continued until all the metal is gone. The reaction mixture is then cooled below the point of reflux, but not so low as to cause the Grignard reagent to precipitate, and 7.3 g. (0.0351 mole) of 5H-dibenzo[a, d]-10,11-dihydrocyclohepten-5-one in 20 ml. of dry THF is added, with stirring, in 15 minutes. The reaction mixture is stirred and refluxed for 6 hours, with 0.5 ml. aliquots withdrawn and worked up each hour for thin layer chromatography (TLC) to follow the reaction. TLC indicates that the reaction is complete in 1 hour; indeed all of the probes spontaneously crystallize upon standing. The reaction mixture (6 hours) is chilled in an ice-bath and treated with 45 ml. of saturated ammonium chloride solution. The layers are separated and just enough water is added to dissolve the solid salts in the aqueous layer. The latter is extracted with 2×25 ml. of ether. The combined organic layers are washed with 25 ml. of saturated salt solution, dried over magnesium sulfate and taken to dryness in vacuo to yield 9.88 g. of a yellow-orange oil. Treatment of this oil with charcoal, in ether, and crystallization from petroleum ether yields 5.49 g. (62.5%) of crude crystalline cyclopropyl carbinol, single spot by TLC. Further recrystallization yields material melting at 72.8–73.8° C.;

$\lambda_{max.}^{MeOH}$ 2630, E 1% cm. 24

Analysis.—Calc'd: C, 86.36; H, 7.24. Found: C, 86.43; H, 7.40.

500 mg. of 5-cyclopropyl-5-hydroxy-5H-dibenzo[a,d]-10,11-dihydrocycloheptene in 15 ml. of dioxane is treated with 9 ml. of 2 M perchloric acid at room temperature for a total of 6 hours. Samples for TLC are withdrawn after 1, 3 and 6 hours and show the reaction to be complete and clean at 1 hour with no further change after 6 hours. Work-up of the reaction mixture yields a crude solid which, after recrystallization, yields 320 mg. (64% yield) of alcohol having the following characteristics; M.P. 89–90.2° C.;

$\lambda_{max}^{MeOH}$ 2375; $E_{554}^{1\% cm.}$; $\lambda_{max.}^{CHCl}$ 2.73, 2.9, 3.25, 3.31, 6.2, 6.34 and 9.5$\mu$ Analysis.—Calc'd for $C_{18}H_{18}O$: C, 86.36; H, 7.24. Found: C, 86.44; H, 7.16.

Following the procedure described in detail in Example 1 above and using equivalent quantities of 5H-dibenzo[a,d]cyclohepten-5-one, there is produced the corresponding 5 - cyclopropyl-5-hydroxy-5H-dibenzo[a,d]cycloheptene.

EXAMPLE 2

5-(γ-hydroxypropylidene)-5H-dibenzo[a,d]cycloheptene

Following the procedure described in detail in Example 1 and using equivalent quantities of 5-cyclopropyl-5-hydroxy-5H-dibenzo[a,d]cycloheptene, there is produced the corresponding 5-(γ-hydroxypropylidene)-5H-dibenzo[a,d]cycloheptene.

EXAMPLE 3

5-(γ-hydroxypropyl)-5H-dibenzo[a,d]cycloheptene

To 0.05 mole of allylmagnesium bromide in 50 cc. of tetrahydrofuran contained in a 250 cc. round bottom 3-necked flask equipped with stirrer, dropping funnel and reflux condenser, is added 0.025 mole of 5-chloro-5H-dibenzo[a,d]cycloheptene in 25 cc. of tetrahydrofuran, dropwise, over 50 minutes. Stirring is continued 2 hours at room temperature after complete addition and refluxed finally for 15 minutes. At the end of this period, the major share of the solvent is removed in vacuo at 50° C. The residue is decomposed with saturated ammonium chloride solution and the organic material extracted with ether. Evaporation of the ether provides the hydrocarbon.

A solution of 5 g. of 5-(γ-propenyl)-5H-dibenzo-[a,d] cycloheptene in 80 cc. of tetrahydrofuran is heated with 1 mole equivalent of bis-3-methyl-2-butyl borane [H. Brown et al., J. Am. Chem. Soc. 84, p. 190 (1962)] at 0–5° C. for three hours. At the conclusion of this period, 3 cc. of water is added, followed by 8 cc. of 2.5 N sodium hydroxide and the dropwise addition of 6–7 cc. of 30% hydrogen peroxide. The aqueous phase is salted with potassium carbonate and the tetrahydrofuran layer separated, dried over magnesium sulfate, and the solvent evaporated in vacuo. The residue is crystallized from ether-petroleum to give the desired carbinol.

EXAMPLE 4

5-(γ-hydroxypropyl)-5H-dibenzo[a,d]-10,11-dihydrocycloheptene

Following the procedure described in Example 3 and using equivalent amounts of the corresponding 10,11-dihydro-derivative of the starting compound, there is produced the above-named hydroxypropyl product.

EXAMPLE 5

Following the procedure described above in Examples 1–4 and using equivalent amounts of the starting compounds substituted with X, X' and Y groups as described above, there is produced the corresponding 5-(γ-hydroxypropyl) intermediates.

EXAMPLE 6

5-(γ-methanesulfonyloxypropylidene)-5H-dibenzo[a,d]-10,11-dihydrocycloheptene To a solution of 1.00 g. of 5-(γ-hydroxypropylidene)-5H-dibenzo[a,d]-10,11-dihydrocycloheptene in 10 cc. of pyridine at 0° C. is added 1.0 cc. of methane sulfonyl chloride. After 16 hours, the mixture is added to ice-water and extracted with benzene. The benzene extract is washed with dilute hydrochloric acid, dilute potassium bicarbonate, water, and dried over magnesium sulfate. The solvent is removed in vacuo to give a residue consisting of 5-(γ-methanesulfonyloxypropylidene)-5H-dibenzo[a,d]-10,11-dihydrocycloheptene.

EXAMPLE 7

5-(γ-p-toluenesulfonyloxypropylidene)-5H-dibenzo[a,d]-10,11-dihydrocycloheptene In the same manner as in the previous example, 5-(γ-hydroxypropylidene) - 5 H- dibenzo[a,d]-10,11-dihydrocycloheptene (1.00 g.) is reacted with 1.5 g. of p-toluenesulfonyl chloride in 10 cc. of pyridine to give 5-(γ-p-toluenesulfonyloxypropylidene)-5H-dibenzo[a,d] - 10,11-dihydrocycloheptene.

EXAMPLE 8

5-(γ-methanesulfonyloxypropylidene)-5H-dibenzo[a,d]cycloheptene

In the same manner as in the previous example, 5-(γ-hydroxypropylidene)-5H-dibenzo[a,d]cycloheptene is reacted with methanesulfonyl chloride to produce the corresponding unsaturated compound.

EXAMPLE 9

5-(γ-methanesulfonyloxypropyl)-5H-dibenzo[a,d]cycloheptene

A solution of 500 mg. of the carbinol prepared in Example 3 in 5 cc. of pyridine at 0° C. is treated with 0.3 cc. of methanesulfonyl chloride and allowed to stand 18 hours at 0–5° C. The product is poured onto ice and extracted with chloroform and the chloroform extract is washed successively with cold 5% aqueous hydrochloric acid, water, and potassium bicarbonate solution. Concentrations of the solvent in vacuo yield the corresponding sulfonic esters.

EXAMPLE 10

5-(γ-p-toluenesulfonyloxypropyl)-5H-dibenzo[a,d]-10,11-dihydrocycloheptene

In the same manner as in the previous example, 5-(γ-hydroxypropyl)-5H-dibenzo[a,d] - 10,11 - dihydrocycloheptene is reacted with p-toluenesulfonyl chloride to produce the corresponding 5-(γ-p-toluenesulfonyloxypropyl)-5H-dibenzo[a,d]-10,11-dihydrocycloheptene derivative.

EXAMPLE 11

Following the procedure described above in Examples 5–10 and using eqiuvalent quantities of corresponding starting materials substituted with X, X' and Y groups as described above, there is produced the corresponding sulfonyloxy derivatives thereof.

EXAMPLE 12

In the same manner as in the previous Examples 5–11, and using benzenesulfonyl chloride, p-nitrobenzene-sulfonyl chloride and ethylsulfonyl chloride in place of methanesulfonyl chloride or p-toluenesulfonyl chloride, there is produced the corresponding hydrocarbon substituted sulfonyloxy derivatives of the cycloheptenes.

EXAMPLE 13

*5-(γ-dimethylaminopropylidene)-5H-dibenzo[a,d]-10,11-dihydrocycloheptene hydrochloride*

A solution of 500 mg. of 5-(γ-methanesulfonyloxypropylidene)-5H-dibenzo[a,d] - 10,11 - dihydrocycloheptene in 5 ml. of benzene in a heavy-walled Pyrex glass tube is saturated with dimethylamine at 10° C. The tube is sealed and kept at 100° C. for 18 hours. It is then cooled and opened. The benzene solution is washed with 5% potassium bicarbonate, water, and saturated salt solution, dried over magnesium sulfate and taken to dryness. The residue is treated with ether saturated with hydrogen chloride to yield crystalline 5-(γ-dimethylaminopropylidene)-5H-dibenzo[a,d] - 10,11 - dihydrocycloheptene hydrochloride, M.P. 190–192° C.

EXAMPLE 14

*5-(γ-dimethylaminopropylidene)-5H-dibenzo[a,d]-10,11-dihydrocycloheptene hydrochloride*

Similar treatment of 5-(γ-p-toluenesulfonyloxypropyldene)-5H-dibenzo[a,d]-10,11-dihydrocycloheptene also eads to 5-(γ-dimethylaminopropylidene) - 5H - dibenzo-[a,d]-10,11-dihydrocycloheptene hydrochloride.

EXAMPLE 15

*5-(γ-dimethylaminopropylidene)-5H-dibenzo[a,d]cycloheptene*

The above-named compound is produced from 5-(γ-p-oluenesulfonyloxypropylidene) - 5H- dibenzo[a,d],cycloteptene and dimethylamine.

EXAMPLE 16

*5-(γ-methylaminopropyl)-5H-dibenzo[a,d]cycloheptene*

The product of Example 9 is dissolved in 20 cc. of ienzene saturated with methylamine at 5–10° C. and teated in a sealed container for 18 hours at 80° C. At he end of this period, the contents of the flask are washed vith potassium bicarbonate solutions and taken to dryness 1 vacuo. The residue is dissolved in ether and treated vith dry hydrogen chloride to precipitate the methylminopropyl compound as its hydrochloride, M.P. 169–71° C.

EXAMPLE 17

*5-(γ-methylaminopropyl)-5H-dibenzo[a,d]-10,11-dihydrocycloheptene*

The above-named compound is produced from 5-(γ-iethanesulfonyloxypropyl) - 5H - dibenzo[a,d] - 10,11-ihydrocycloheptene and methylamine.

EXAMPLE 18

When other amines such as ammonia, cycloloweralkylmines, loweralkenylamines, arylamines, aralkylamines nd amines containing lower alkyl atoms linked together ith an atom selected from the group consisting of trogen, hydrogen and oxygen to form a heterocyclic ng, such as 1-piperidyl, 1-pyrrolidyl, 4-morpholinyl and lower alkyl-4-piperazinyl, are substituted for methylaine and dimethylamine, there is produced the corresɔnding 5-(3-aminopropyl) or 5-(3-aminopropylidene) ɔmpounds.

EXAMPLE 19

*10-chloro-5-(γ-methylaminopropyl)-5H-dibenzo[a,d]cycloheptene*

To a solution of 25.0 g. of 5H-dibenzo[a,d]-10,11-dihydrocyclohepten-5-one in 2.5 ml. phosphorus oxychloride and 50 ml. dry benzene is added 75 g. phosphorus pentachloride (3 eq.) and the mixture is stirred under reflux for 2.5 hours with protection from moisture. After ca. 15 minutes, a clear red solution results and a crystalline complex slowly separates accompanied by evolution of hydrogen chloride. At the end of the reflux period, the reaction mixture is chilled to 10° C. and the dark red complex is isolated by filtration and washed twice with 25 ml. of dry benzene.

A 0.5 g. sample of the crystalline red complex obtained from the reaction of dienone with PCl$_5$ above is heated for one hour at 100° C. in vacuum. The cooled reaction product on trituration with acetic acid deposits 10-chlorodibenzo[a,d]cyclohepten-5-one, M.P. 118–121° C.; recrystallization from methanol affords material, M.P. 125–126.5° C.

5-cyclopropyl-5-hydroxy derivative of the 10-chlorodibenzo[a,d]cyclohepten-5-one then is produced in the same manner by the Grignard reaction with cyclopropyl dioxane, as described in detail in Example 1.

500 mg. of 10-chloro-5-cyclopropyl-5-hydroxy-5H-dibenzo[a,d]cycloheptene in 15 ml. of dioxane is treated with 9 ml. of 2 M perchloric acid at room temperature for a total of 6 hours. Work-up of the reaction mixture yields a curd solid which, after recrystallization, yields 10-chloro - 5 - (γ - hydroxypropylidene) - 5H - dibenzo[a,d]cycloheptene.

To a solution of 1.0 g. of 10-chloro-5-(γ-hydroxypropylidene)-5H-dibenzo[a,d]cycloheptene, 10 cc. pyridine at 0° C. is added 1.0 cc. of methanesulfonyl chloride. After 16 hours, the mixture is added to ice-water and extracted with benzene. The benzene extract is washed with dilute hydrochloric acid, dilute potassium bicarbonate, water, and dried over magnesium sulfate. The solvent is removed in vacuo to give a residue consisting of 5-(γ-methanesulfonyloxypropylidene) - 5H - dibenzo[a,d] 10,11-dihydrocyclopheptene.

A solution of 500 mg. of 5-(γ-methanesulfonyloxypropylidene) - 5H - dizenzo[a,d] - 10,11 - dihydrocycloheptene in 5 ml. of benzene in a heavy-walled Pyrex glass tube is saturated with dimethylamine at 10° C. The tube is sealed and kept at 100° C. for 18 hours. It is then cooled and opened. The benzene solution is washed with 5% potassium bicarbonate, water, and saturated salt solution, dried over magnesium sulfate and taken to dryness. The residue is treated with ether saturated with hydrogen chloride to yield 10-chloro-5-(γ-methylamino propyl)-5H-dibenzo[a,d]cycloheptene.

I claim:

1. A 5-(γ-hydrocarbonsulfonyloxypropyl)-5H-dibenzo[a,d]cycloheptene wherein the γ-hydrocarbonsulfonyloxypropyl substituent is a member selected from the group consisting of γ-mesyloxypropyl,
γ-ethylsulfonyloxypropyl,
γ-propylsulfonyloxypropyl,
γ-butylsulfonyloxypropyl,
γ-benzenesulfonyloxypropyl,
γ-naphthylsulfonyloxypropyl,
γ-p-nitrobenzenesulfonyloxypropyl and
γ-p-tolylsulfonyloxypropyl.

2. A 5-(γ - hydrocarbonsulfonyloxypropylidene) - 5H-dibenzo[a,d]cycloheptene wherein the γ-hydrocarbonsulfonyloxypropylidene substituent is a member selected from the group consisting of γ-mesyloxypropylidene,
γ-ethylsulfonyloxypropylidene,
γ-propylsulfonyloxypropylidene, γ-butylsulfonyloxypropylidene,
γ-benzenesulfonyloxypropylidene,
γ-naphthylsulfonyloxypropylidene,
γ-p-nitrobenzenesulfonyloxypropylidene and
γ-p-tolylsulfonyloxypropylidene.

3. A 5-(γ-hydrocarbonsulfonyloxypropyl)-5H-dibenzo-[a,d]-10,11-dihydrocycloheptene wherein the γ-hydrocarbonsulfonyloxypropyl substituent is a member selected from the group consisting of γ-mesyloxypropyl,
γ-ethylsulfonyloxypropyl,
γ-propylsulfonyloxypropyl,
γ-butylsulfonyloxypropyl,
γ-benzenesulfonyloxypropyl,
γ-naphthylsulfonyloxypropyl,
γ-p-nitrobenzenesulfonyloxypropyl and
γ-p-tolylsulfonyloxypropyl.

4. A 5-(γ-hydrocarbonsulfonyloxypropylidene)-5H-dibenzo[a,d]-10,11-dihydrocycloheptene wherein the γ-hydrocarbonsulfonyloxypropylidene substitutent is a member selected from the group consisting of γ-mesyloxypropylidene,
γ-ethylsulfonyloxypropylidene,
γ-propylsulfonyloxypropylidene,
γ-butylsulfonyloxypropylidene,
γ-benzenesulfonyloxypropylidene,
γ-naphthylsulfonyloxypropylidene,
γ-p-nitrobenzenesulfonyloxypropylidene and
γ-p-tolylsulfonyloxypropylidene.

5. 5 - (γ - mesyloxypropyl) - 5H - dibenzo[a,d]cycloheptene.

6. 5-(γ - mesyloxypropyl) - 5H - dibenzo[a,d] - 10,11-dihydrocycloheptene.

7. 5-(γ-mesyloxypropylidene)-5H - dibenzo[a,d]cycloheptene.

8. 5 - (γ - mesyloxypropylidene) - 5H - dibenzo[a,d]-10,11-dihydrocycloheptene.

9. 5 - (γ - tolylsulfonyloxypropyl) - 5H - dibenzo[a,d]cycloheptene.

10. 5-(γ-tolylsulfonyloxypropyl) - 5H - dibenzo[a,d]-10,11-dihydrocycloheptene.

11. 5-(γ - tolylsulfonyloxypropylidene) - 5H - dibenzo[a,d]cycloheptene.

12. 5-(γ - tolylsulfonyloxypropylidene) - 5H - dibenzo[a,d]-10,11-dihydrocycloheptene.

13. 5-(γ-mesyloxypropylidene)-3-methylsulfonyl - 5H-dibenzo[a,d]cycloheptene.

14. 5-(γ-tolysulfonyloxypropylidene) - 3 - methylsulfonyl-5H-dibenzo[a,d]cycloheptene.

15. 3-dimethylsulfamyl-5 - (γ - mesyloxypropylidene)-5H-dibenzo[a,d]cycloheptene.

16. 3-dimethylsulfamyl-5-(γ - tolylsulfonyloxypropylidene)-5H-dibenzo[a,d]cycloheptene.

References Cited

Beckwith et al.: J. Chem. Soc. (London), vol. of 1956, pp. 1108–1115.

Cristol et al.: J. Am. Chem. Soc., vol .82, pp. 6155–6162 (1960).

Rigaudy et al.: Compt. Rend., vol. 240, pp. 1347–1349 (1955).

Winthrop et al.: J. Org. Chem., vol. 27, pp. 230–240 (1962).

CHARLES B. PARKER, *Primary Examiner.*

FLOYD D. HIGEL, *Assistant Examiner.*

UNITED STATES PATENT OFFICE
CERTIFICATE OF CORRECTION

Patent No. 3,332,977　　　　　　　　　　　　　　　July 25, 1967

Norman L. Wendler

It is hereby certified that error appears in the above numbered patent requiring correction and that the said Letters Patent should read as corrected below.

Column 2, lines 3 to 9, the formula should appear as shown below instead of as in the patent:

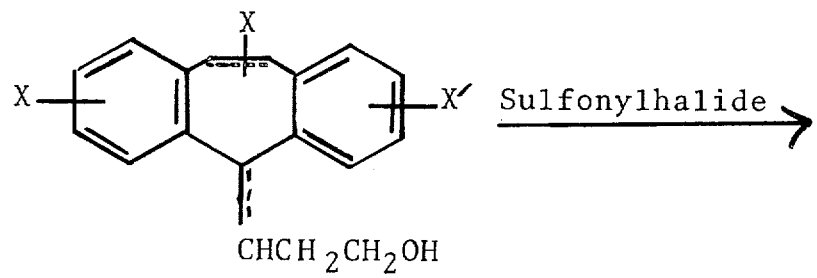

same column 2, lines 20 to 26, for that portion of the formula reading

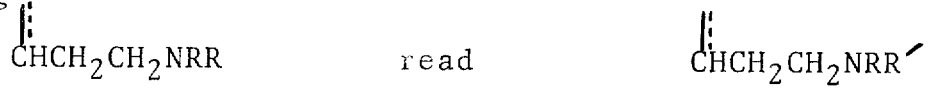

column 5, line 29, for "9.5μ" read -- 9.6μ --; column 6, line 74, for "eqiuvalent" read -- equivalent --; column 8, line 3, for "cycloheptene" read -- cycloheptene --; line 44, for "dizenzo" read -- dibenzo --; column 10, line 15, for "-tolysulfonyloxypropylidene)-" read -- -tolylsulfonyloxypropylidene)- --.

Signed and sealed this 6th day of August 1968.

(SEAL)
Attest:

EDWARD M. FLETCHER, JR.　　　　　　　　　EDWARD J. BRENNER
Attesting Officer　　　　　　　　　　　　Commissioner of Patents